United States Patent [19]

Honea

[11] Patent Number: 5,353,313
[45] Date of Patent: Oct. 4, 1994

[54] TRANSMISSION OF A CLOCK SIGNAL OVER AN ASYNCHRONOUS DATA CHANNEL

[75] Inventor: William K. Honea, Denver, Colo.

[73] Assignee: AT&T Bell Laboratories, Murray Hill, N.J.

[21] Appl. No.: 866,721

[22] Filed: Apr. 10, 1992

[51] Int. Cl.⁵ .................... H04L 7/00; H04L 25/36
[52] U.S. Cl. ................................ 375/118; 375/110; 370/102
[58] Field of Search ............... 375/25, 106, 118, 110; 358/13, 17, 19; 370/102, 103, 60, 94.1, 94.2

[56] References Cited

U.S. PATENT DOCUMENTS

| | | | |
|---|---|---|---|
| 4,718,074 | 1/1988 | Mannas et al. | 375/118 |
| 4,731,646 | 3/1988 | Kliem | 358/13 |
| 5,014,271 | 5/1991 | Fujimoto et al. | 375/118 |

Primary Examiner—Stephen Chin
Assistant Examiner—Don Vo
Attorney, Agent, or Firm—John A. Caccuro

[57] ABSTRACT

An input clock signal associated with an input data signal is divided by a predetermined integer N, to form a sub-rate clock signal. The sub-rate clock signal is sampled and transmitted along with the input data over an asynchronous data channel. At the receiver, the resulting sub-rate clock signal is received and coupled to a phase lock loop which generates a recovered clock signal of the same frequency and substantially in phase with the input clock signal.

12 Claims, 1 Drawing Sheet

TRANSMITTER UNIT 100

RECEIVER UNIT 200

TRANSMISSION OF A CLOCK SIGNAL OVER AN ASYNCHRONOUS DATA CHANNEL

TECHNICAL FIELD

This invention relates to data transmission and, more particularly, to the transmission of synchronous clock signals over an asynchronous data channel.

BACKGROUND OF THE INVENTION

In synchronous data communication systems a problem exists to maintain the clock at the receiver in phase synchronization with the clock at the transmitter. Synchronization is needed to enable clock signals at the receiver to coincide with the center of the received data pulses, thus assuring that data bits are not added, lost or misinterpreted during data transmission.

For example, the transmission of digital video data over a digital communications channel usually requires that the communications channel be synchronous to the video data rate for complete recovery of the video data and its associated clock at the receiver. This requirement is due to the circuit (synchronous) rather than packet (asynchronous) nature of full motion video data. Although the video data can be packetized and sent over an asynchronous channel using elastic stores at both the transmitter and receiver, the video source A/D clock must still be synchronized to the receiver D/A converter clock to ensure error-free video transmission.

Prior art methods of video data transmission require 1) synchronization to the communications channel (synchronous transmission), 2) sending the clock information over a separate synchronous channel, 3) synchronizing transmitter and receiver to a third (master) clock source, or 4) accepting video data errors at the receiver as a result of the differences in transmit and receive clocks. Thus, if the communication channel does not operate synchronously with the video data source, the resulting solutions add complexity and expense to providing video data transmission.

Consequently, there is a continuing need to simplify the circuitry and reduce the cost of synchronizing transmitter and receiver clocks over an asynchronous communication channel.

SUMMARY OF THE INVENTION

In accordance with the present invention, a transmitter apparatus transmits the logic state of an input data (e.g., video) clock signal, which has been divided-down by a predetermined integer N ($N \geq 2$), along with data over an asynchronous communication channel. The integer N is selected so that the resulting "sub-rate" clock signal is at a frequency which is less than or equal to one-half of the data word transmission rate of the asynchronous communication channel. The asynchronous communication channel also has an average data word transmission rate which is greater than the input data rate.

The sub-rate clock signal is received at the receiver and the input data clock signal is regenerated. The integer N is selected to minimize jitter caused by the asynchronous communication channel and to enable the input-data clock signal to be regenerated using practical bandpass filtering and phase lock loop operation. Elastic stores in the transmitter and receiver apparatus accommodate the maximum delay between asynchronous data transmissions over the asynchronous communication channel.

DETAILED DESCRIPTION

In the following description, each item or block of each figure has a reference designation associated therewith, the first number of which refers to the figure in which that item is first located (e.g., 110 is located in FIG. 1).

Figure 1:
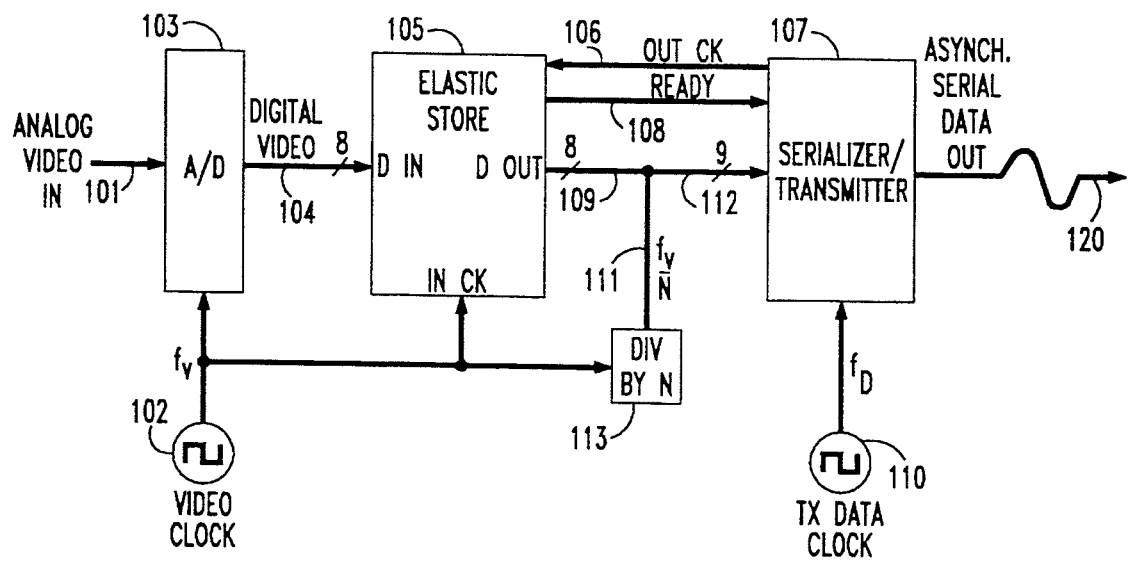
FIG. 1 shows a block diagram of a transmitter unit in accordance with the present invention and FIG. 2 shows a block diagram of a receiver unit in accordance with the present invention.

FIG. 1 shows a block diagram of the transmitter unit 100 of a transmission system. From the diagram, it is seen that there are two independent clocks, video sampling clock 102 with frequency $f_V$ (video sample word data rate) and transmit (TX) data word clock 110 with frequency $f_D$. The only required relationship between the two clocks is that $f_D > f_V$.

The present invention thus enables the synchronization of data signals between a transmitter source and a receiver location over a data channel which operates asynchronously thereto. According to the invention, the clock signal of the input data signal ($f_V$) is divided down to a frequency $f_V/N$ such that the transmit data word or average data packet rate ($f_D$) would be equal to or greater than the Nyquist rate ($2f_V/N$). In the present invention since $f_D > f_V$ then the Nyquist rate is satisfied as long as $N \leq 2$.

Analog video signal 101 is sampled by video clock 102 in the analog to digital (A/D) converter 103 and generates a resulting 8-bit digital signal, on bus 104, having a data rate of $f_V$ words per second. This digitized video information, on bus 104, is stored in the input side D_IN of elastic store 105 which operates as a FIFO (First Ira First Out) buffer. The same video clock 102 used to sample the analog signal is also used to write the digitized video into the elastic store 105.

The out clock lead 106 clocks data out of the elastic store 105, via D_OUT when serializer/transmitter 107 is ready for a new word of data, and the elastic store 105 is not empty. The ready signal 108 indicates when data is available in elastic store 105 to be transmitted.

Since the frequency of transmit data word clock 110 ($f_D$) is greater than the frequency of the video clock 102 ($f_V$), serializer/transmitter 107 output data transmission rate is larger than the data rate of the outgoing digitized video on bus 104. Therefore, one or more data words will be periodically serialized containing "idle code" or no video information. This idle code information is encoded into the protocol at the serializer/transmitter 107 to enable the receiver to distinguish between data words and unused words.

The 8-bit digitized video data word (D_OUT), bus 109, from elastic store 105, is combined with 1 bit of clock logic state information 111 to form a 9-bit word, bus 112, into the serializer/transmitter 107. This clock bit inserted into adjacent video data words represents the state of the video sampling clock 102, divided down, by divide-by-N circuit 113, to a lower rate clock having a frequency of $f_V/N$. The logic state of this "sub-rate" clock (0 or 1) is inserted together with the digitized video data words as part of the asynchronous serial data words transmitted by serializer/transmitter 107 over communication channel 120.

Figure 2:
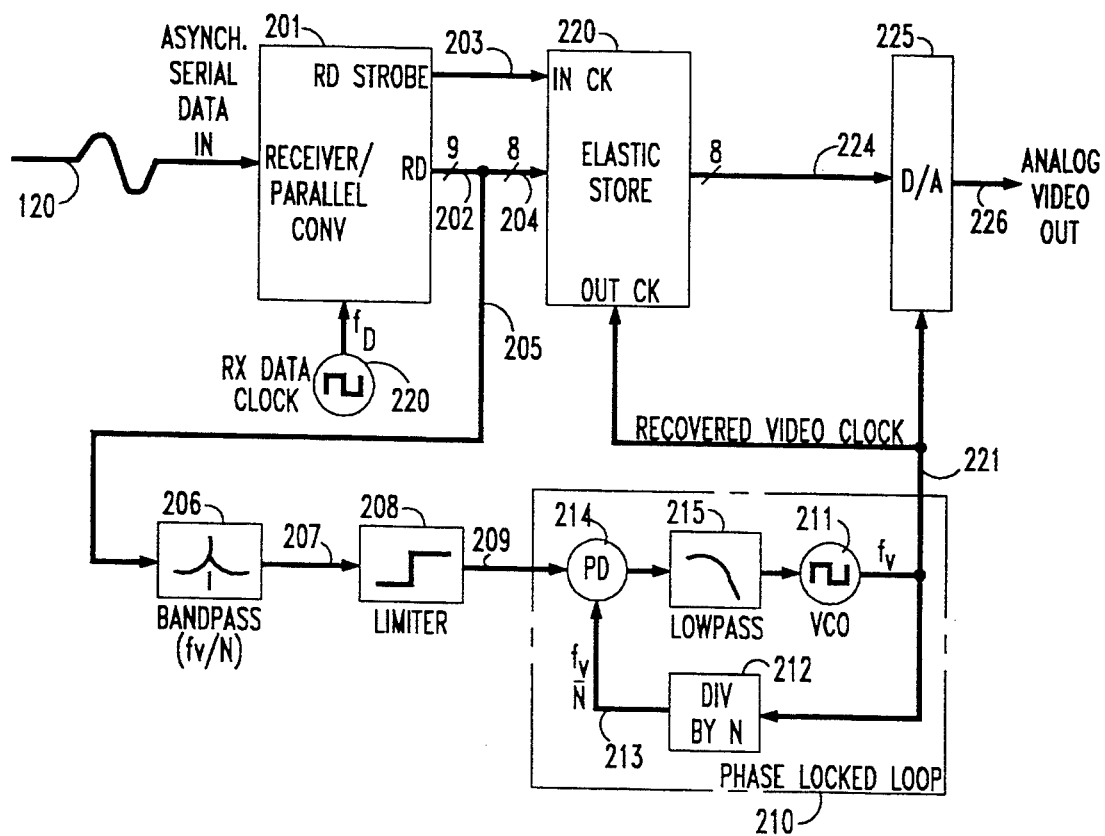

FIG. 2 shows a block diagram of the receiver unit 200 of a transmission system. The serial data stream received over communication channel 120 from transmitter 100 is clocked, by receiver (RX) clock 220, into receiver/parallel converter 201. The receiver (RX) clock 220 also clocks a 9-bit parallel data stream onto bus 202. Receiver (RX) clock 220 is synchronized to transmitter (TX) clock 110 in accordance with the clock synchronization technique associated with the transmission system (FIG. 1 and 2), whose operation is not relevant to the present invention. The read (RD) strobe, 203 of receiver/parallel converter 201, indicates the presence of a new data word and is used to load the 8 bits of video data on bus 204 into the input of the elastic store 220. Elastic store 220 operates as a FIFO, in a manner similar to elastic store 105 of transmitter 100. The 9th bit, lead 205, representing the state of the sampled sub-rate clock is routed to bandpass filter 206 with a center frequency of $f_V/N$. The purpose of the bandpass filter 206 is to remove most of the jitter from the received sampled sub-rate clock caused by the uncertainty between the time of transitions of the sub-rate clock at the transmitter (which is based on the video clock 102), and the time a data word is transmitted (based on the transmit data clock 110). The output 207 of bandpass filter 206 is a sine wave signal due to the stripping of higher harmonics by bandpass filter 206. The limiter 208 provides a de-jittered sub-rate clock signal, 209, to the phase locked loop 210 which recreates the video clock 102 by multiplying the sub-rate clock up by a factor of N.

The phase lock loop 210 includes a voltage controlled oscillator (VCO) 211 which generates the local video clock signal $f_V$ on lead 221. The output of oscillator 211 is divided down by divider circuit 212 whose output 213 has the frequency of $f_V$ divided by N. A switching phase comparator 214 compares the phase of the recovered $f_V/N$ signal on lead 209 with the reference $f_V/N$ signal on lead 213. The output of comparator 214 passes through a low-pass filter 215 for removal of switching frequency components generated by the switching phase comparator 214. The output of the low-pass filter 215 is then fed to the control input of VCO 211 for locking the phase of the recovered video clock signal 221 to the video clock signal generated by transmitter 100. The recovered video clock 221 is used to clock data from elastic store 220, via bus 224, into the digital to analog converter (D/A) 225. The D/A unit 225 is clocked by recovered video clock 221 to provide an analog video output on lead 226.

The present method of transmitting a synchronous clock asynchronously over communication channel 120 is independent of the transmission media used. The transmission can take place over fiber, wired, or wireless communication channels.

The type of transmission system used to deliver the data words from the transmitter to the receiver can be a synchronous (constant rate) transmission system, or an asynchronous (packet) system. The only restriction in a constant rate system is that the transmission data rate $(f_D)$ be greater than the video data rate $(f_V)$. In this type of system, the elastic store may be as small as one word. In an asynchronous or packet transmission system, the restriction is that the average data word transfer rate be greater than the video data rate $f_V$. The elastic store (105 and 220) size used in such a system would be determined depending on the maximum interval between packet bursts and the size of the packets. The minimum elastic store size would have to accommodate input data from the A/D converter 103 over the maximum time period between packet transmissions.

The choice of the division factor N is a design implementation choice which is dependent on several factors. In general, the larger the value of N, the less jitter will be realized in the recovered video clock. The disadvantage of larger values of N is that the bandpass filter at the receiver becomes more difficult to realize, and the acquisition time of the phase lock loop increases.

An illustrative example of a system where this method of clock transmission might be used is in transmitting 27 MByte (million word) video data between a transmitter unit 100 and receiver unit 200 over a serial communication channel or link operating at 500 Mb/s (million bits per second). The 27 MHz video clock is completely asynchronous to the 500 MHz (million hertz) transmission channel clock. If N is chosen to be 256, the frequency of the transmitted sub-rate clock 111 is approximately 105 KHz, so the bandpass filter 206 at the receiver 200 is centered on 105 KHz, and the phase lock loop 210 synchronizes the recovered video clock of 27 MHz divided by 256 to the 105 KHz signal appearing on bit 9 of the received word. The transmission system takes care of the synchronization and transmission of data at the 500 MHz rate over channel 120, independent of the 27 MHz data.

The disclosed clock adjustment method and apparatus enables a user to transmit data at its own synchronous data rate over a higher bit rate independently asynchronous communication system or packet communication system.

If the system is a packet system the jitter of the recovered clock signal could be much worse than with a continuous transmission (circuit) system which operates asynchronous to the input (source) clock signal.

In the circuit system an input clock transition would, in the worst case, be detected in adjacent data words transmitted by the system. In the packet system the input clock transition would, in the worst case, be detected in adjacent data words which themselves are in two different data packets. Thus, in the circuit system there is a regular jitter which is equal to plus or minus about one half of the system data word time period. In comparison in a packet system, the jitter time can be plus or minus about one half of the sum of the system data word time period and maximum delay time between adjacent data packets. However, this jitter is reduced substantially by filtering at the receiver.

In the present invention, since clock information is transmitted as an extra bit of data, little channel capacity is utilized for clock information transmission resulting in efficient channel capacity utilization. Thus, no separate data channel is needed to send the clock signal to the receiver.

The commercial benefits of the present invention are the savings in cost of complexity by sending clock information along with the data, and eliminating the requirement that the communications channel be synchronous with the data source. This also gives greater flexibility and fewer restrictions when designing a data transmission system, allowing for a less expensive and less accurate timing mechanism to be utilized without increasing data errors.

Implementation of the disclosed apparatus can utilize one or more well-known standard integrated circuits to provide the disclosed functions. Moreover, the disclosed apparatus can be implemented as a custom integrated circuit or as a part of a microprocessor controlled system. Hence, the disclosed embodiments of my invention are merely illustrative and other embodiments known to those skilled in the art would provide similar functions without deviating from the scope of my invention.

I claim:

1. Transmitter apparatus for communicating an input digital data word and an input clock signal over a communication channel at a data word transmission rate which operates asynchronously with respect to said input clock signal, said transmitter comprising means for generating said input data word from an input analog signal sampled by said input clock signal, said input clock signal being derived independently of said input analog signal, means for dividing said input clock signal by a predetermined integer to obtain a sub-rate frequency clock signal which is less than or equal to one-half of the data word transmission rate of said transmitter and means for combining a logic state sample of said sub-rate clock signal together with said input data word to form each data word to be transmitted in a packet data format from said transmitter.

2. The transmitter of claim 1 wherein an average data word transmission rate is greater than an average input data word generation rate.

3. The transmitter of claim 1 wherein said sub-rate clock signal is one Nth of frequency of said input clock signal, where N is greater than or equal to 2.

4. The transmitter of claim 1 wherein said sub-rate clock signal is one Nth of the frequency of said input clock signal, where N is chosen such that the ratio of the data word transmission rate of said transmitter to the sub-rate clock signal to insure that any clock signal recovered from said data word has a jitter that is less than a predetermined jitter rate.

5. The transmitter of claim 1 further comprising elastic store means for storing inputted data words using said input clock signal and for outputting said stored data words into adjacent data words transmitted from said transmitter using a transmitter data clock which operates asynchronous to said input clock signal.

6. A data communication system including a transmitter and a receiver connected together over a communication channel, said transmitter comprising means for generating an input data word from an input analog signal sampled by an input clock signal, said input clock signal being derived independently of said input analog signal, means for dividing down said input clock signal to obtain a sub-rate frequency clock signal which is substantially below and operates asynchronously to a data word transmission rate of said transmitter and means for combining a logic state sample of said sub-rate clock signal together with said input data word to form each data word to be transmitted in a packet data format from said transmitter; and said receiver comprising means for extracting said logic state sample from each of said data words received from said transmitter and phase lock loop for generating, from said logic state sample, a recovered clock signal of the same frequency and substantially in phase with said input clock.

7. The system of claim 6 wherein said sub-rate clock signal is one Nth of the frequency of said input clock signal, where N is greater than or equal to 2.

8. The system of claim 6 wherein said sub-rate clock signal is one Nth of the frequency of said input clock signal, where N is chosen such that the ratio of the data word transmission rate of said system to the sub-rate clock signal frequency results in a recovered receiver clock jitter that is less than a predetermined jitter rate established for said recovered clock signal.

9. The system of claim 6 wherein said transmitter further comprises elastic store means for storing inputted data words using said input clock signal and for outputting said stored data words into adjacent data words transmitted from said transmitter over said communication channel using a transmitter data clock which operates asynchronous to said input clock signal and wherein said receiver further comprises elastic store means for storing adjacent data words received over said communication channel from said transmitter using a receiver data clock signal which operates synchronous to said transmitter data clock signal and for outputting said stored adjacent data words using said recovered clock signal.

10. A method of operating a transmitter apparatus to communicate an input digital data word and an input clock signal over a communication channel at a data word transmission rate which operates asynchronously with respect to said input clock signal, said method comprising the steps of generating said input data word from an input analog signal sampled by said input clock signal, said input clock signal being derived independently of said input analog signal, dividing said input clock signal by a predetermined integer to obtain a sub-rate frequency clock signal which is substantially below a data word transmission rate of said transmitter and combining a logic state sample of said sub-rate clock signal together with said input data word to form each data word to be transmitted in a packet data format from said transmitter.

11. The method of claim 10 wherein said sub-rate clock signal is one Nth of the frequency of said input clock signal, where N is chosen such that the ratio of the data word transmission rate of said transmitter to the sub-rate clock signal to insure that any clock signal recovered from said data word has a jitter that is less than a predetermined jitter rate.

12. A method of operating a data communication system including a transmitter and a receiver connected together over a communication channel, said method, at said transmitter, comprising the steps of accepting an input clock signal which is asynchronous with respect to a data word transmission clock of said transmitter, generating an input data word from an input analog signal sampled by an input clock signal, said input clock signal being derived independently of said input analog signal, dividing down said input clock signal to obtain a sub-rate frequency clock signal which is substantially below and operates asynchronously to a data word transmission rate of said transmitter, combining a logic state sample of said sub-rate clock signal together with said input data word to form each data word to be transmitted in a packet data format from said transmitter; and at said receiver extracting said logic state sample from each of said data words received from said transmitter and generating, from said logic state sample, a recovered clock signal of the same frequency and substantially in phase with said input clock.

* * * * *